(12) United States Patent
Yamada et al.

(10) Patent No.: US 7,583,651 B2
(45) Date of Patent: Sep. 1, 2009

(54) WIRELESS COMMUNICATION APPARATUS AND WIRELESS COMMUNICATION SYSTEM FOR ADJUSTING THE TRANSMISSION INTERVAL IN AN AD-HOC WIRELESS NETWORK

(75) Inventors: Akira Yamada, Yokohama (JP); Atsushi Fujiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 380 days.

(21) Appl. No.: 11/392,726

(22) Filed: Mar. 30, 2006

(65) Prior Publication Data

US 2006/0221927 A1    Oct. 5, 2006

(30) Foreign Application Priority Data

Mar. 31, 2005    (JP) ............................. 2005-102873

(51) Int. Cl.
*H04J 3/00*    (2006.01)
(52) U.S. Cl. ..................... 370/345; 370/338; 370/351
(58) Field of Classification Search ................. 370/345, 370/338, 351
See application file for complete search history.

(56) References Cited

U.S. PATENT DOCUMENTS

2003/0128690 A1    7/2003    Elliott et al.
2003/0163579 A1    8/2003    Knauerhase et al.
2003/0231608 A1*   12/2003   Wentink ..................... 370/338
2004/0072559 A1    4/2004    Kakumaru et al.
2004/0259542 A1    12/2004   Viitamaki et al.
2005/0025092 A1    2/2005    Morioka et al.

FOREIGN PATENT DOCUMENTS

| EP | 1 317 098 A2 | 6/2003 |
| EP | 1 463 242 A2 | 9/2004 |
| JP | 7-298357 | 11/1995 |
| JP | 2003-60657 | 2/2003 |
| JP | 2004-128949 | 4/2004 |
| WO | WO 01/92992 A2 | 12/2001 |

OTHER PUBLICATIONS

"A compilation based on IEEE Std 802.11™—1999 (R2003) and its amendments, Wireless LAN medium access control (MAC) and Physical layer (PHY) specification", IEEE Wireless LAN Edition, 1999, 706 Pages.

* cited by examiner

*Primary Examiner*—Lester Kincaid
*Assistant Examiner*—Charles Shedrick
(74) *Attorney, Agent, or Firm*—Oblon, Spivak, McClelland, Maier & Neustadt, P.C.

(57) ABSTRACT

A wireless communication apparatus capable of constructing an ad-hoc wireless network is disclosed to include a transmitting/receiving unit configured to transmit and receive a common broadcast signal; and a transmission interval control unit configured to change transmission interval of the common broadcast signal to be transmitted depending on the number of communication nodes existing in communication range of the wireless communication apparatus or on the wireless resource utilization status.

9 Claims, 11 Drawing Sheets

OPERATION OF NEW NODE

S201 SEARCH NEARBY NODE → S203 TRANSMIT CONNECTION REQUEST TO NEARBY NODE → S205 START COMMUNICATING WITH NEARBY NODE → S207 SET BEACON INITIAL VALUE TO DOUBLE DEFAULT VALUE ("2a")

FIG.4A

OPERATION OF INITIAL NODE

S101 START TRANSMITTING INITIAL NODE BEACON (AT BEACON INTERVAL "a") → S103 RECEIVE CONNECTION REQUEST FROM NEW NODE → S105 START COMMUNICATING WITH NEW NODE → S107 DOUBLE THE BEACON INTERVAL (SET TO "2a")

TIME

FIG.5

BEACON INTERVAL: 100 ms

FIG.6

BEACON INTERVAL
OF EACH NODE: 200 ms

FIG.7

BEACON INTERVAL
    OF AP1: 200 ms

BEACON INTERVAL
    OF AP2: 300 ms

BEACON INTERVAL
    OF AP3: 200 ms

| SSID (2) | Supported Rate (6) | DS ParamSet (3) | TIM (6) | Country (8) | | | |
|---|---|---|---|---|---|---|---|
| | | | | | EDCA (20) | | |
| | | | | | | FCS (4) | |

| MAC-Header (18) | Time Stamp (8) | BeacInt (2) | Capability Info (2) |
|---|---|---|---|

- TIME REQUIRED FOR BEACON TRANSMISSION
  - PREAMBLE: 192us
  - MAC HEADER TO FCS: 632us(1Mbps)
  - TOTAL: 824us

FIG.14

WIRELESS COMMUNICATION APPARATUS AND WIRELESS COMMUNICATION SYSTEM FOR ADJUSTING THE TRANSMISSION INTERVAL IN AN AD-HOC WIRELESS NETWORK

FIELD OF THE INVENTION

The present invention generally relates to a wireless communication apparatus and a wireless communication system in a wireless ad-hoc network, and more particularly, to a wireless communication apparatus and a wireless communication system capable of adjusting the beacon transmission interval autonomously depending on the number of communication nodes in communication range and/or the environment of the wireless section.

BACKGROUND OF THE INVENTION

An ad-hoc wireless network system is an autonomous communication system that allows wireless mobile devices to communicate directly with each other without going through a base station, or to communicate with each other via another mobile device between them. Even if the system currently has a configuration in which only some of the mobile devices can reach each other, a data item transmitted by a source device is relayed by other mobile devices to the destination device.

Figure 1:
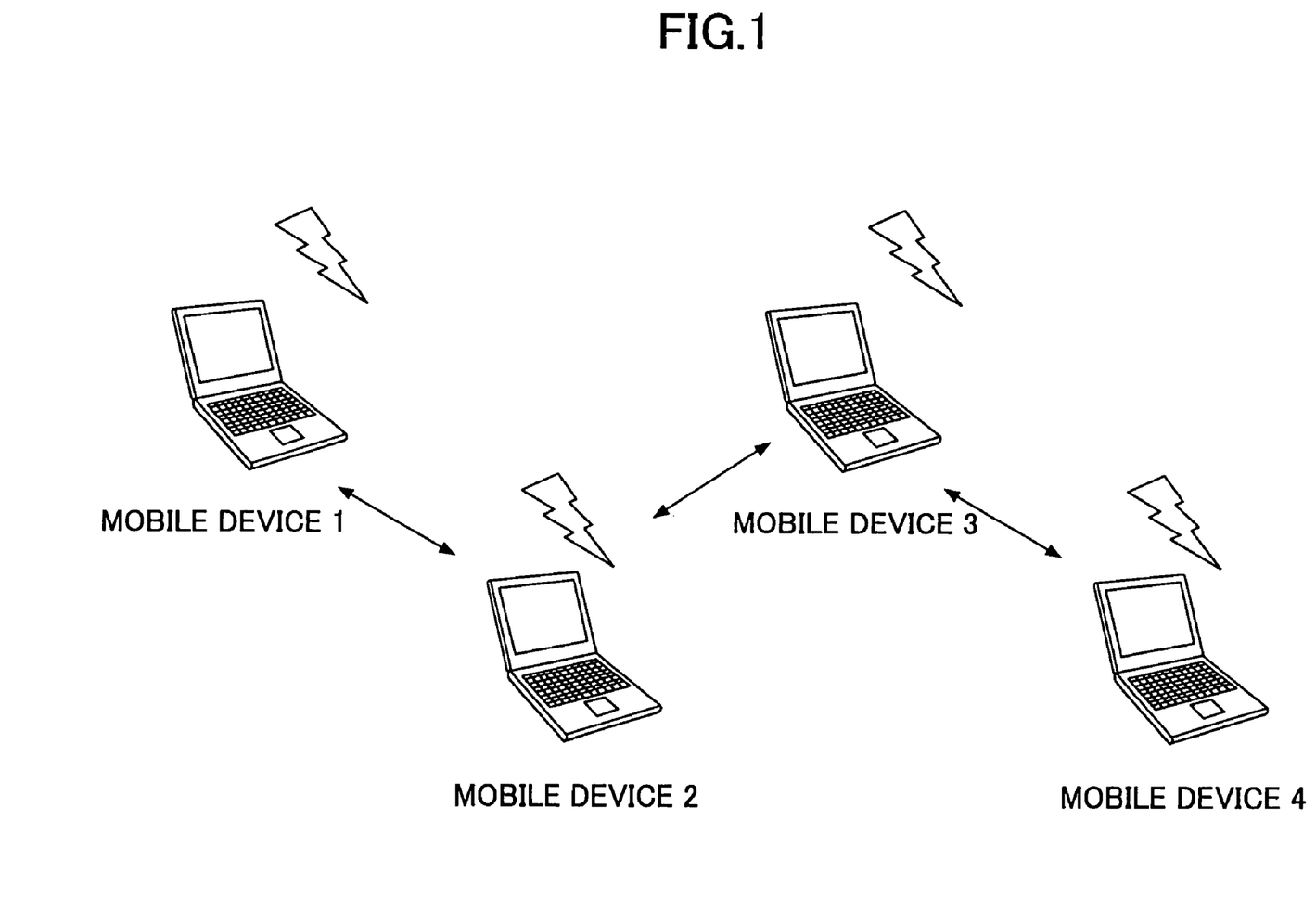
FIG. 1 is a schematic diagram illustrating an ad-hoc network.
Figure 2:
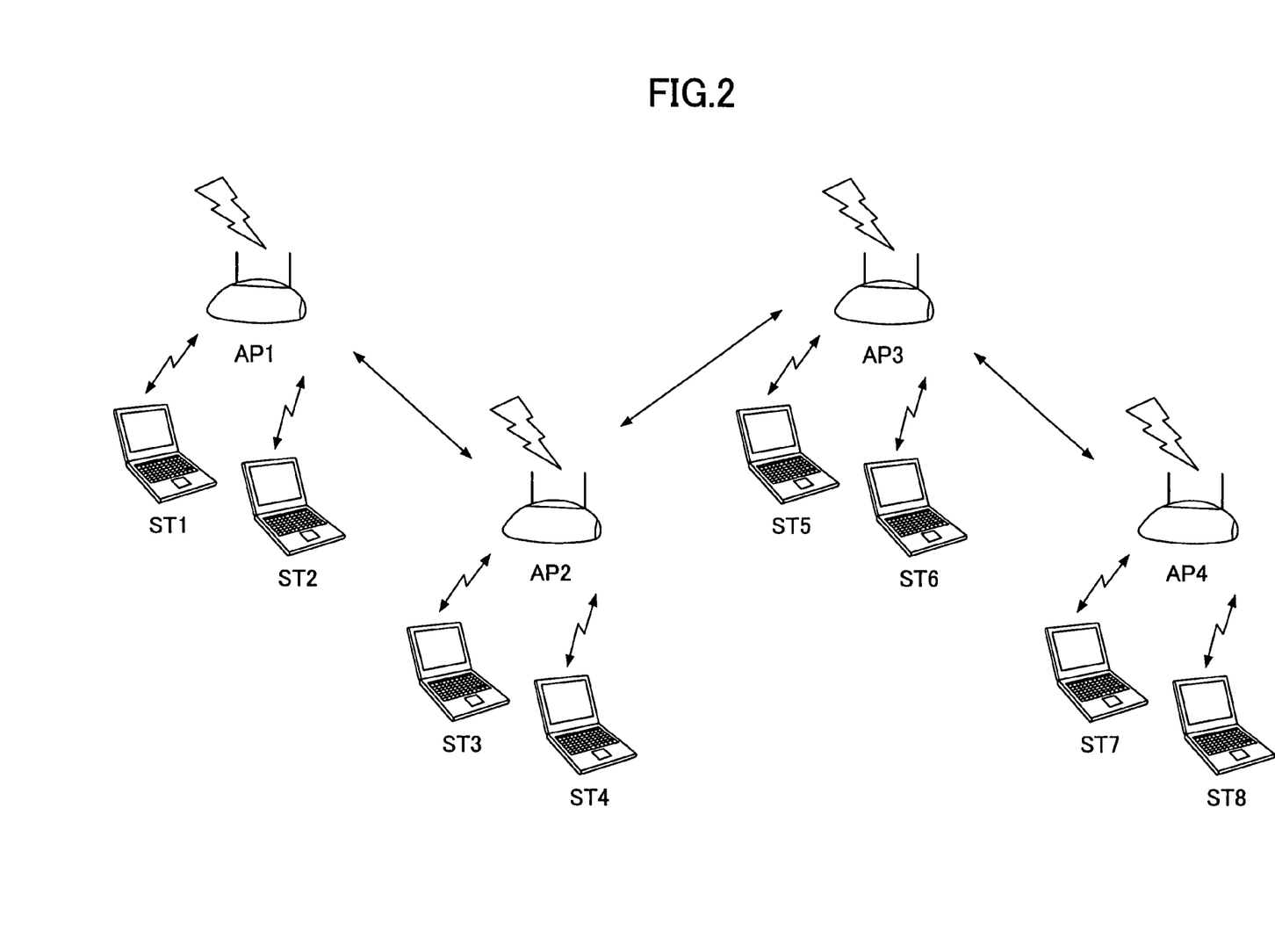
FIG. 2 is a schematic diagram illustrating a mesh network.

There are two types of ad-hoc wireless networks, i.e., an ad-hoc network consisting of only wireless LAN devices such as laptop computers as illustrated in FIG. 1, and a mesh network consisting of access points and wireless LAN devices as illustrated in FIG. 2. In this context, both types of network are referred to as an "ad-hoc wireless network".

In an ad-hoc wireless network, data transmission is performed directly between mobile devices as long as they are located within communication range. In FIG. 1, direct data transmission is performed between devices 1 and 2, devices 2 and 3, and devices 3 and 4. Between out-of-range devices, such as devices 1 and 4, devices 1 and 3, and devices 2 and 4, data transmission is performed via an in-between device.

Each of the communication nodes in an ad-hoc wireless network (wireless LAN devices 1-4 in FIG. 1 and access points AP1 through AP4 in FIG. 2) continually transmits a common broadcast signal (hereinafter referred to as a "beacon signal") at constant intervals to communicate the existence of that node to the nearby communication nodes or the wireless LAN devices currently belonging to that node in order to enhance connection with the adjacent nodes or the wireless LAN devices.

In general, beacon transmission interval is determined by the initial node that sets up the network, and the lowest transmission rate is generally selected for the purpose of widening the communication range as much as possible. Selecting a low transmission rate means that the channel time occupied by the beacon signal becomes longer. This leads to a serious problem of consumption of wireless resources when the number of nodes transmitting the beacon signals increases.

Figure 3:
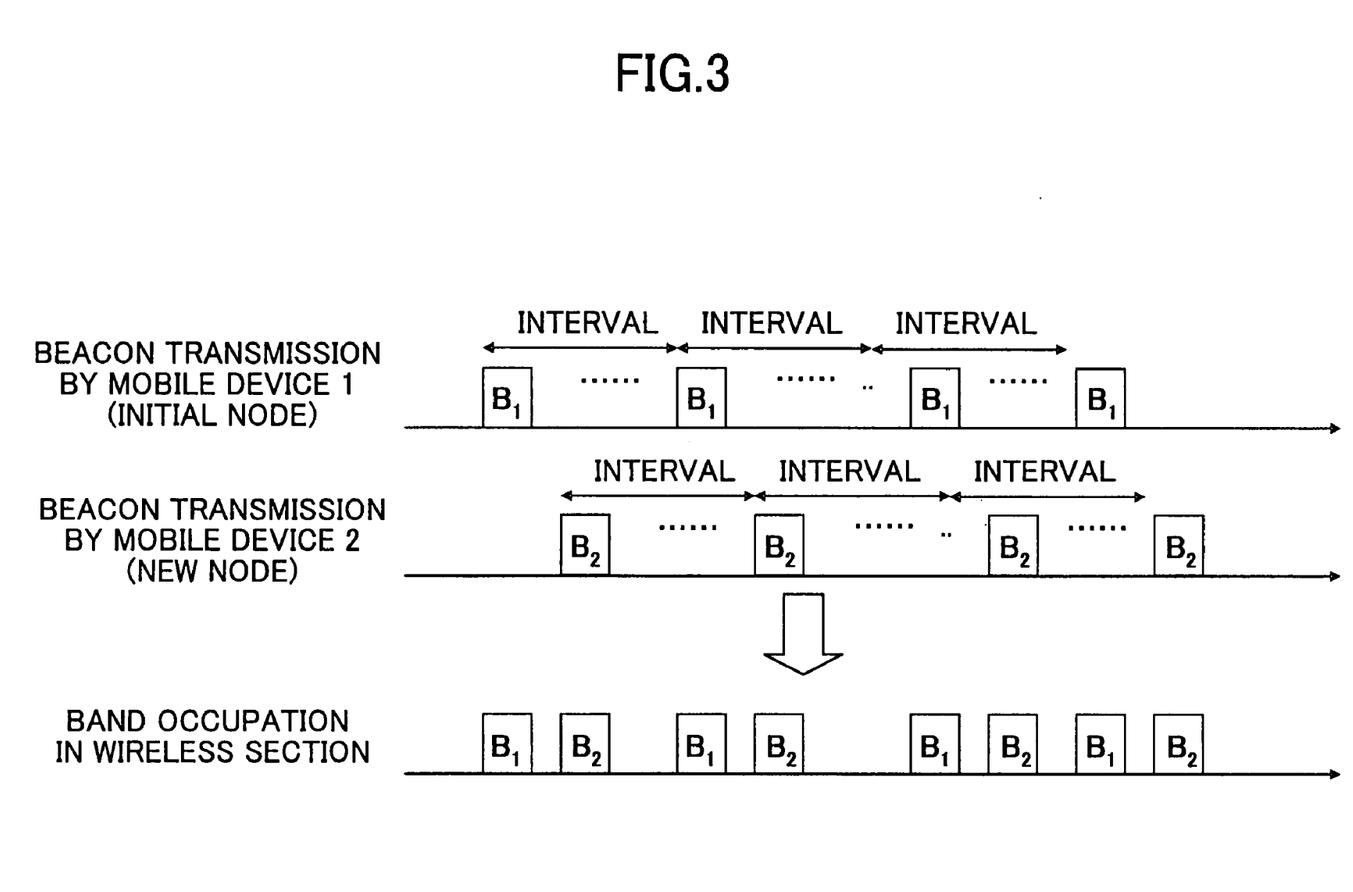
FIG. 3 is a schematic block diagram for explaining occupancy of a wireless channel by beacon signals.

FIG. 3 is a schematic diagram for explaining the issue of channel occupation that becomes conspicuous as the number of communication nodes increases in an ad-hoc wireless network. For example, mobile device 1 in FIG. 1 sets up a network as the initial node, and is transmitting a beacon signal B1 at prescribed intervals. Then mobile device 2 participates in the network as a new node, and starts transmitting a beacon signal B2 at the same intervals. In this case, the wireless channel is occupied by beacon signals B1 and B2, and therefore, the band occupancy ratio doubles.

Another problem is collision between beacon signals and data packets transmitted from the communication nodes. With the wireless LAN IEEE 802.11 standard, packet collision with a beacon signal is avoided stochastically by a collision avoidance mechanism. However, this mechanism works on the assumption that packets are retransmitted from each node after a random time, and packets collide with each other only if the random times agree with each other between two or more nodes. In addition, the more the number of nodes, the higher is the collision probability.

The ANSI/IEEE 802.11 standard states that a beacon signal is always transmitted at constant intervals. See, ANSI/IEEE std 802.11, Wireless LAN medium access control (MAC) and Physical layer (PHY) specifications, 1999. This specification accepts a transmission delay under congestion, but does not provide a change in beacon interval. Consequently, a beacon signal is always transmitted at constant intervals even if a large part of the wireless channel is occupied by beacon signals due to many nodes existing in communication range. As a result, the situation illustrated in FIG. 3 occurs.

A system designed so as to allow a wireless LAN device to connect itself to a less congested access point among multiple wireless LAN access points by measuring a transmission time delay under congestion of beacon signals is proposed. See, for example, JP 2003-60657A. However, again the beacon interval is kept constant.

Another proposal is that multiple mobile devices currently connected to an access point change the beacon receiving interval by linking up the operating modes with each other. See, for example, JP 2004-128949A. In this publication, each mobile terminal connected to an access point changes and adjusts the beacon receiving interval n times the reference interval; however, the beacon transmission interval at the access point is kept constant.

It is also proposed, in data transmission between a base station and wireless cellular devices belonging to this base station, to generate a random number at each cellular device to distribute the transmission interval in order to avoid data collision. See, for example, JP 7-298357A.

SUMMARY OF THE INVENTION

The present invention aims to reduce undesirable overhead (resource consumption) of a wireless channel due to beacon transmission, as well as packet collision probability, in ad-hoc wireless networks relying on an IEEE 802.11 wireless LAN or other wireless networks.

By reducing the overhead and/or packet collision probability, wireless channel availability is increased in an ad-hoc wireless network.

The present invention provides a wireless communication system in which each wireless communication apparatus in a network can change the transmission interval of a broadcast signal, such as a beacon signal, in an autonomous manner depending on the number of communication nodes exiting in communication range and/or the wireless resource utilization status.

The present invention is applicable to an arbitrary wireless communication network system formed by communication nodes that transmit broadcast signals (such as beacon signals) or indicator signals. Communication nodes include wireless LAN base stations (access points) and wireless LAN devices.

In one aspect of the invention, a wireless communication apparatus used in an ad-hoc wireless network is provided. The wireless communication apparatus comprises:
(a) a transmitting/receiving unit configured to transmit and receive a common broadcast signal; and (b) a transmission interval control unit configured to change the transmission interval of the common broadcast signal depending on the number of communication nodes existing in communication range, or on the wireless resource utilization status.

For example, the transmission interval control unit changes the transmission interval of the common broadcast signal by multiplying the initial interval by the number of nodes existing in communication range.

In a preferred example, the wireless communication apparatus further comprises a user device management unit configured to monitor the operating mode of a user device currently located under the wireless communication apparatus, and a reporting unit configured to report the change of the transmission interval to the user device. In this case, the transmission interval control unit causes the reporting unit to generate a transmission interval changing message if the user device is in a specific mode.

In another aspect of the invention, a wireless communication system applicable to an ad-hoc wireless network consisting of two or more wireless communication apparatuses is provided. In this system, each wireless communication apparatus is configured to change the transmission interval of a common broadcast signal depending on wireless resource utilization status.

In an example, a first wireless communication apparatus transmitting a first common broadcast signal at initial interval changes the transmission interval of the first common broadcast signal upon starting to communicate with a second wireless communication apparatus in response to a connection request transmitted from the second wireless communication apparatus.

For example, the first wireless communication apparatus doubles the initial interval to establish a new transmission interval.

On the other hand, the second wireless communication apparatus monitors the first common broadcast signal transmitted from the first wireless communication apparatus to change the transmission interval of a second common broadcast signal of the second wireless communication apparatus.

For example, the second wireless communication apparatus changes the transmission interval of the second common broadcast signal to double the initial interval of the first wireless communication apparatus.

The above-described arrangement can prevent an excessive amount of wireless channel consumption and packet collision due to transmission of common broadcast signals (such as beacon signals). In addition, the performance of the ad-hoc wireless network can be improved as a whole. By avoiding collision of beacon packets, the connectivity of the wireless LAN devices can be enhanced.

BRIEF DESCRIPTION OF THE DRAWINGS

Other features and advantages of the invention will become more apparent from the following detailed description when read in conjunction with the accompanying drawings, in which.

DETAILED DESCRIPTION OF THE PREFERRED EMBODIMENT

The preferred embodiment of the present invention is described below in conjunction with the attached drawings.

Figure 4A:
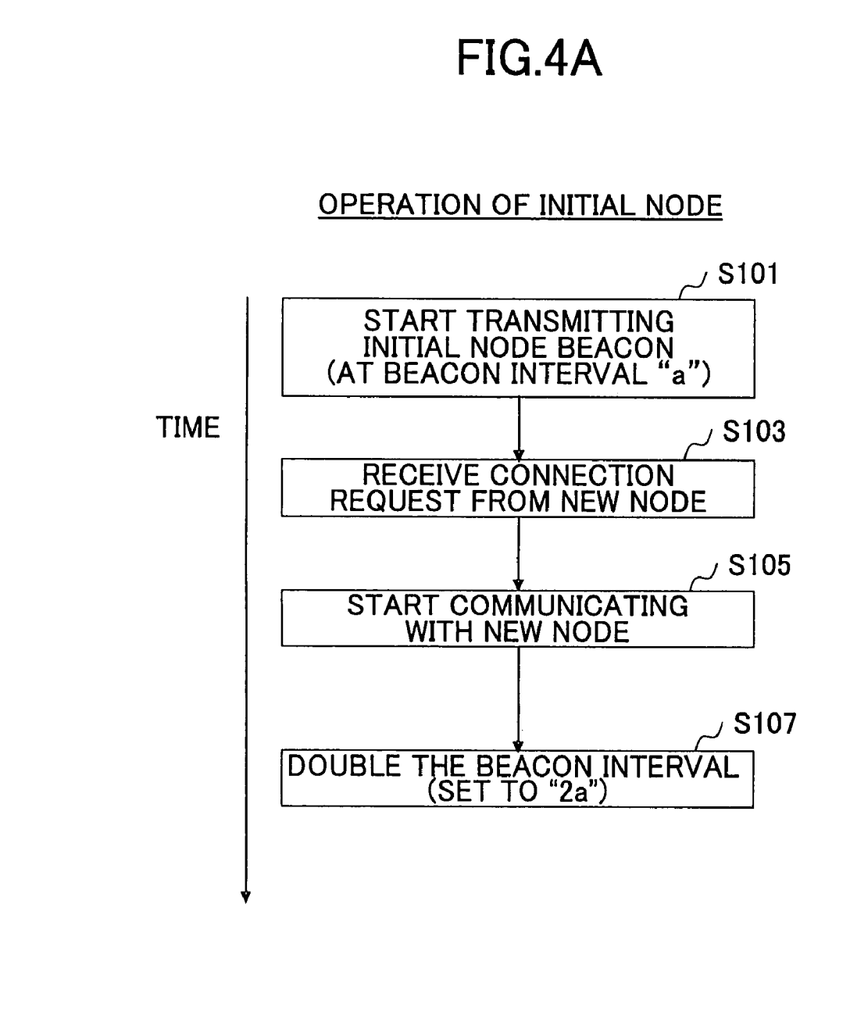
FIG. 4A is an operations flow of the initial node.
Figure 4B:
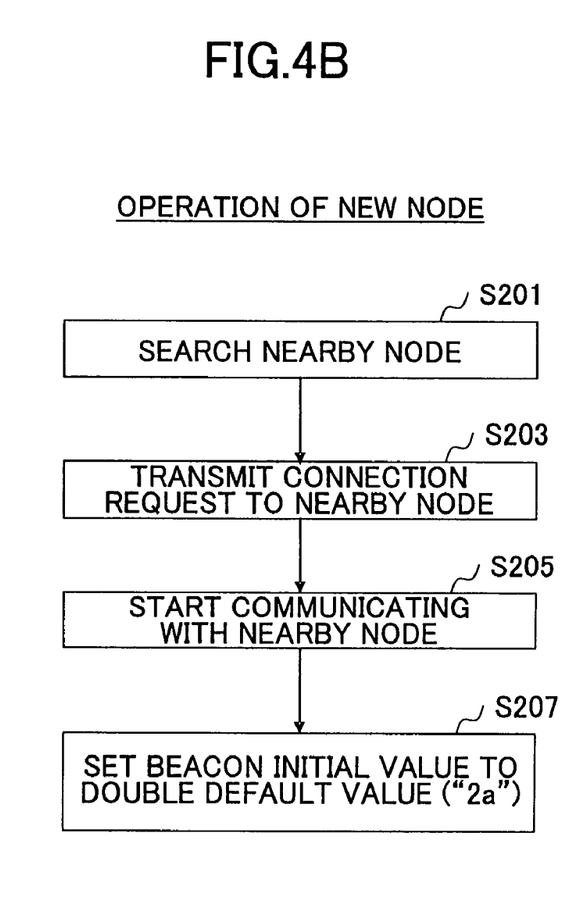
FIG. 4B is an operations flow for the newly connected node.

FIG. 4A is an operations flow for determining the beacon transmission interval carried out by an initial node that establishes a network, and FIG. 4B is an operation flow of the beacon transmission interval determination process performed by a second node newly connected to the initial node. For simplification purposes, the ad-hoc wireless network illustrated in FIG. 1 is used as an example.

Wireless mobile device 2 in FIG. 1 first establishes an ad-hoc wireless network, and starts transmitting a beacon signal at an initial transmission interval "a" (step S101).

Then the wireless mobile device 2 detects participation of a new node in the network by receiving a connection request from a new wireless mobile device, for example, wireless mobile terminal 1 shown in FIG. 1 (step S103).

The wireless mobile device 2 starts communicating with the wireless mobile device 1 (step S105) and changes the beacon transmission interval to 2a by doubling the initial interval "a" (step S107).

In the example shown in FIG. 4A, the beacon interval is changed according to the number of nodes existing in the communication area after the communication channel has been established with the newly connected communication node. However, the system may be designed such that each of the communication nodes, which nodes define the ad-hoc wireless network, changes the beacon transmission interval according to the number of nodes existing in the communication area by counting the beacon signals transmitted from the adjacent communication node for a prescribed period of time.

The number of communication nodes can be determined by statistically processing and averaging the source address fields contained in the received beacon signals. Each of the communication nodes determines the beacon transmission interval based on the determined number of nearby nodes existing in the communication range. If two nearby nodes are detected, there are a total of three communication nodes including the focused-on communication node, and therefore, the communication node triples the beacon transmission interval.

In addition, the system may be designed such that each of the communication nodes measures the wireless channel utilization status in its communication area and changes the beacon transmission interval when the wireless channel occupation ratio exceeds a prescribed level. In this case, the initial node acquires utilization status of the wireless section, in place of the connection request, in step S103 of FIG. 4A. This arrangement can also prevent uneconomical channel consumption by beacon signals and reduce the packet collision probability.

FIG. 4B is an operations flow of a second communication node newly participating in the ad-hoc wireless network. Wireless mobile device 1 shown in FIG. 1 has participated in the ad-hoc wireless network and starts searching for nearby nodes (step S201). In this example, wireless mobile device 1 detects wireless mobile device 2 as a nearby node and transmits a connection request (step S203). Then the wireless mobile device 1 starts communicating with the wireless mobile device 2 (step S205), and sets the initial beacon interval at "$2a$" by doubling the default value "$a$".

Using the algorithm illustrated in FIG. 4A and FIG. 4B, wireless channel resource consumption by beacon transmission can be maintained substantially constant regardless of the number of nearby nodes or the wireless section utilization status. Consequently, the communication throughput of the ad-hoc wireless network can be maintained constant as a whole.

Figure 5:
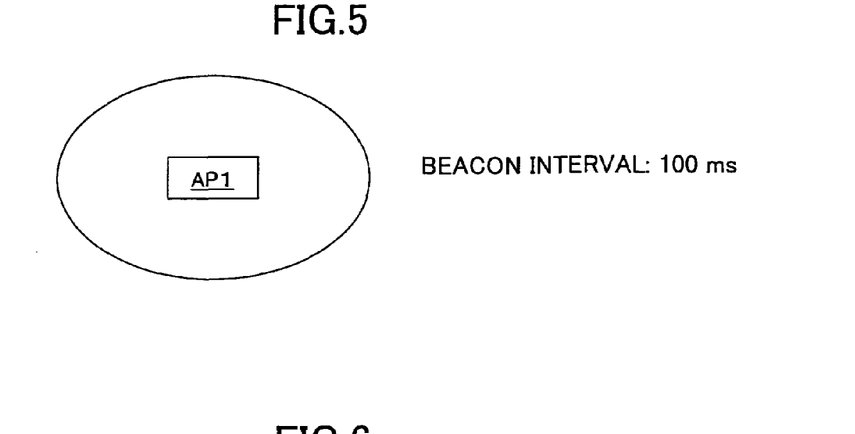
FIG. 5 is a schematic diagram illustrating the beacon transmission interval when the initial node establishes a network.
Figure 6:
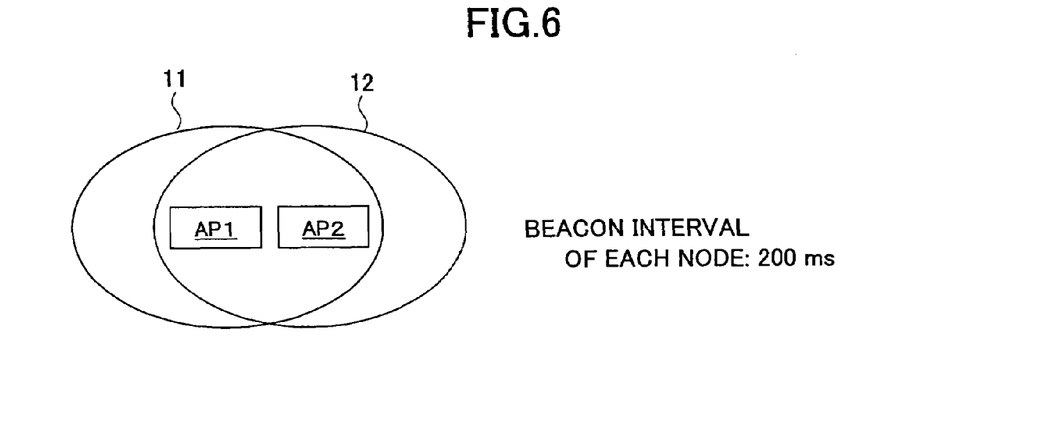
FIG. 6 is a schematic diagram illustrating the beacon transmission interval when the second node is connected to the network.
Figure 7:
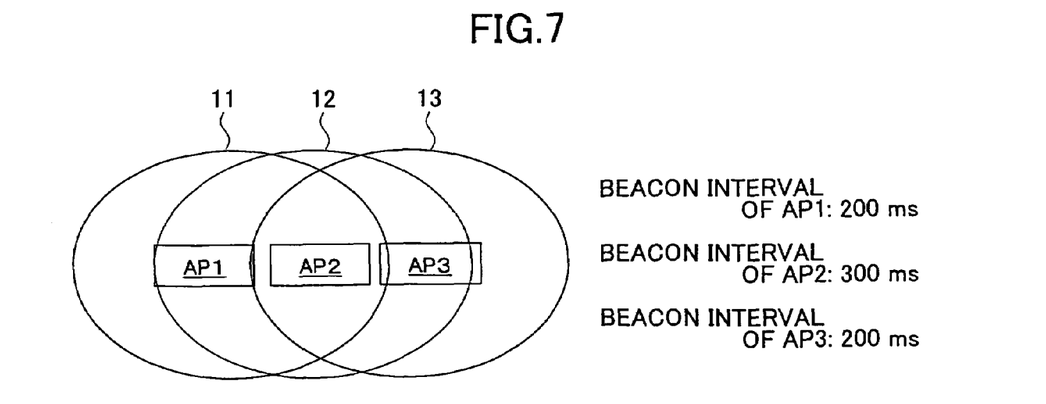
FIG. 7 is a schematic diagram illustrating the beacon transmission interval when the third node is connected to the network.

FIG. 5 through FIG. 7 are schematic diagrams illustrating application of the algorithm illustrated in FIGS. 4A and 4B to the mesh network shown in FIG. 2. Each of access points AP1 through AP4, which access points serve as wireless base stations, arbitrarily participates in the network to structure the mesh ad-hoc network. Under each of the access points are existing user devices (STs).

In FIG. 5, access point AP1 is activated and is operating as an initial node. The initial node is a node that does not find any other connectable nodes in its range through full-scan of the channels available for the wireless interface.

For example, there are 14 channels (channel 1 through channel 14) defined in the IEEE 802.11b. A wireless communication node becomes the initial node when no beacon has been observed even after all the fourteen channels are scanned, or when no nearby node is connected due to lack of authorization in the link establishing authentication process.

The initial node transmits the beacon signal at the initial beacon interval. In this embodiment, the initial beacon interval is 100 ms, which interval is generally used in typical wireless LAN base station apparatuses.

It should be noted that an arbitrary wireless channel may be selected after the full-range channel scan although a typical wireless LAN product is configured to select the least congested wireless channel (with least packets received).

In FIG. 6, a new access point AP2 is activated in communication range of AP1. Through the full-range channel scan, AP 2 detects the existence of access point AP1 by receiving the beacon signal transmitted from the access point AP1. Then AP1 and AP2 establish a link between themselves through a connection request and authentication defined by the IEEE 802.11 specification.

Having completed authentication of AP2, the access point AP1 changes the beacon interval to double interval (200 ms) in order to prevent over-consumption of wireless channel resources and increased packet collision due to beacon transmissions.

On the other hand, the new node (AP2) having started communicating with AP1 measures the beacon interval from AP1 and changes its beacon interval from the default value according to the measurement result. There are several methods for measuring the beacon interval from AP1 including, for example, (1) using beacon interval information contained in the beacon frame transmitted from AP1, or (2) measuring beacon signals from AP1 for a prescribed period of time to average them. The former method making use of the beacon interval information does not require a new algorithm because the IEEE 802.11 requires that a beacon bears beacon interval information. The latter method of averaging the beacon signals can be implemented by counting the number of beacons transmitted from AP1 for ten seconds, for example. In this example, the AP2 changes its beacon interval to double the initial interval (200 ms), as in AP1.

In FIG. 7, the number of nearby nodes further increases. A third access point AP3 located in the communication range of AP2 is to participate in the network. In this configuration, AP1 receives a beacon from AP2, AP2 receives beacons from AP1 and AP3, and AP3 receives a beacon from AP2. AP1 and AP3 detect only AP2 as a nearby node, while AP2 detects two nearby nodes, AP1 and AP3, within communication range.

In this case, the number of nearby nodes (APs) perceived by AP1 from the received beacons does not change, and accordingly, AP1 does not change its beacon interval. Since AP2 starts communicating with AP3 in addition to AP1, AP2 changes the beacon interval to triple the initial beacon transmission interval, that is, 300 ms (3×100 ms). On the other hand, the new node AP3 sets its beacon interval to 200 ms because it detects a beacon only from AP2.

Meanwhile, in the mesh ad-hoc network shown in FIG. 2, the operating modes of user devices located under an access point have to be taken into consideration in the beacon interval control process. Under the circumstances where a user device (ST) is operating by relying on the beacon signal (such as operating in the power-save mode), the change of beacon interval greatly affects the user device and it may not be accepted. For example, in the power-save mode, the user device (ST) located under the access point (AP) is regulating the power source based on the beacon interval. If the beacon interval transmitted from the access point (AP) is changed, the synchronization between the node (access point) and the user device (ST) cannot be maintained any longer, and communication may be disconnected.

Therefore, a beacon interval control method taking into account the operating modes and/or transmission schemes of user devices located under an access point is provided in the embodiment.

Figure 8:
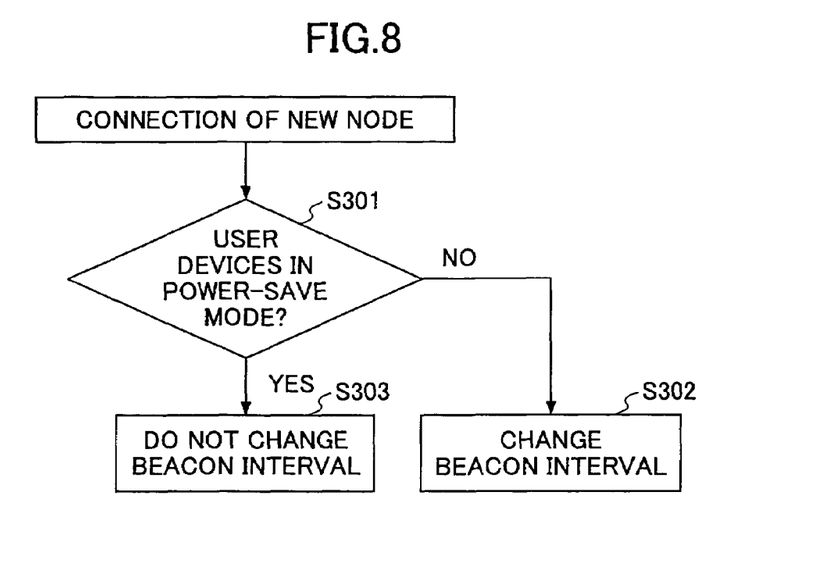
FIG. 8 is a flowchart showing an example of the control of the beacon transmission interval according to the operating mode of a user device currently belonging to the communication area of the wireless communication apparatus.
Figure 9:
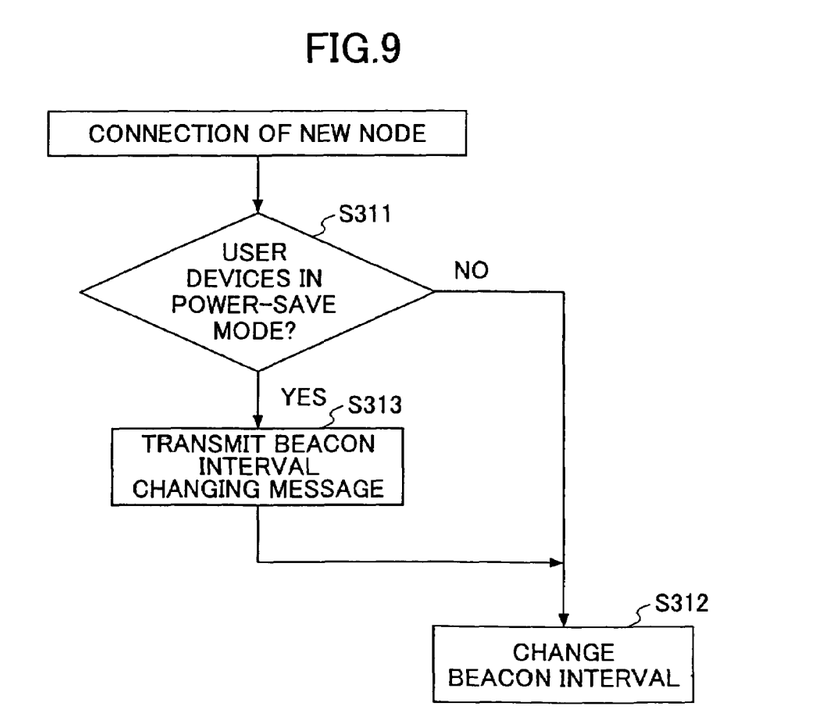
FIG. 9 is a flowchart showing another example of the control of the beacon transmission interval according to the operating mode of the user device.
Figure 10:
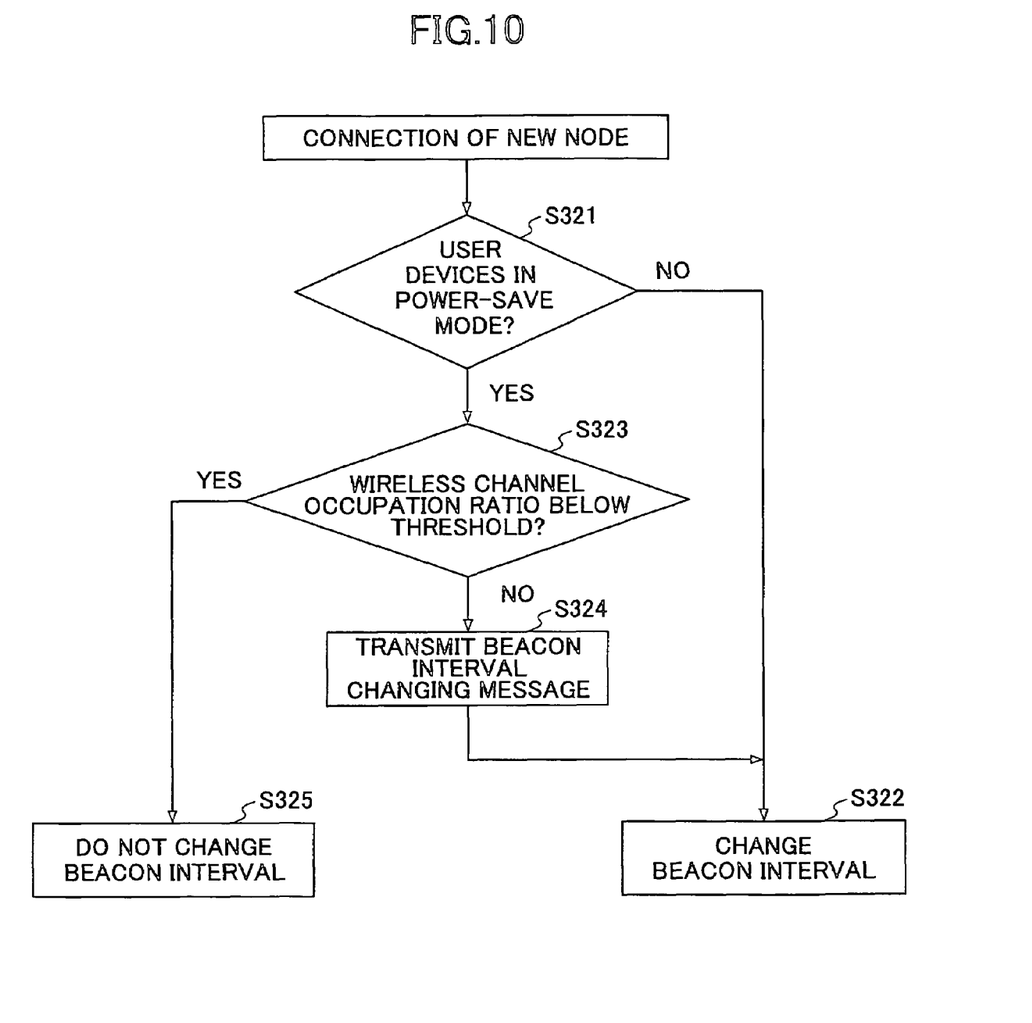
FIG. 10 is a flowchart showing still another example of the control of the beacon transmission interval according to the operating mode of the user device.

FIG. 8 through FIG. 10 are flowcharts of beacon interval control processes carried out by an access point according to the operating mode of a user device located under the access point.

In FIG. 8, the beacon interval is not changed if one or more user devices (ST) under this access point (AP) are operating in the power-save mode. To be more precise, if a change of beacon interval is needed due to the fact that the number of nearby nodes has increased along with connection of a new node, or that the wireless section utilization status has changed, the access point determines whether the user devices (ST) located under this access point are operating in the power-save mode (step S301).

If one or more user devices (ST) are currently in the power-save mode (YES in S301), the current beacon interval is maintained (step S303). If the user devices (ST) are not in the power-save mode (NO in S301), the beacon interval is changed to an appropriate interval (step S302).

The system may be designed such that the beacon interval is changed without determination as to the operating modes of the user devices (ST) as long as there are no or a very few user devices existing under the access point. In this case, a step of determining the number of user devices currently existing under the access point is carried out prior to step S301, and the operating modes of the user devices are determined only when the number of user devices is more than or equal to a prescribed number.

In the example shown in FIG. 9, the beacon interval is changed after a beacon interval changing message is transmitted. First, if it become necessary for the access point to change the beacon interval due to the fact that the number of nearby nodes has increased along with connection of a new node, or that the wireless section utilization status has changed, the access point determines whether the user devices (ST) located under the access point (AP) are operating in the power-save mode (step S311). If one or more user devices (ST) are in the power-save mode (YES in S311), the access point (AP) transmits a beacon interval changing message to the user devices (step S313), and then changes the beacon interval (step S312). If the user devices (ST) are not in the power-save mode (NO in S311), the process jumps to step S312 to change the beacon interval.

In the example shown in FIG. 10, the beacon interval is maintained depending on the wireless section utilization status when the user devices (ST) are operating in the power-save mode. First, if it becomes necessary for the access point to change the beacon interval because the number of nearby nodes has increased along with connection of a new node or the other facts, the access point determines whether the user deices (ST) under this access point (AP) are in the power-save mode (S321). If the user devices are in the power-save mode (YES in S321), it is then determined whether the wireless channel occupation ratio is at or below a threshold level (step S323). If the wireless channel occupation ratio is at or below the threshold level (YES in S323), the beacon interval is maintained without any change (step S325). If the wireless channel occupation ratio exceeds the threshold level (NO in S323), a beacon interval changing message is transmitted from the access point to the user devices (step S324), and then the beacon interval is changed (step S322). If in S321 the user devices are not in the power-save mode, the process jumps to step S322 to change the beacon interval.

By employing any one of the arrangements shown in FIG. 8 through FIG. 10, the demand for reducing channel resource consumption and packet collision due to beacon transmission and the requirement for maintaining reliable communications between the access point and the user devices are both satisfied.

Figure 11:
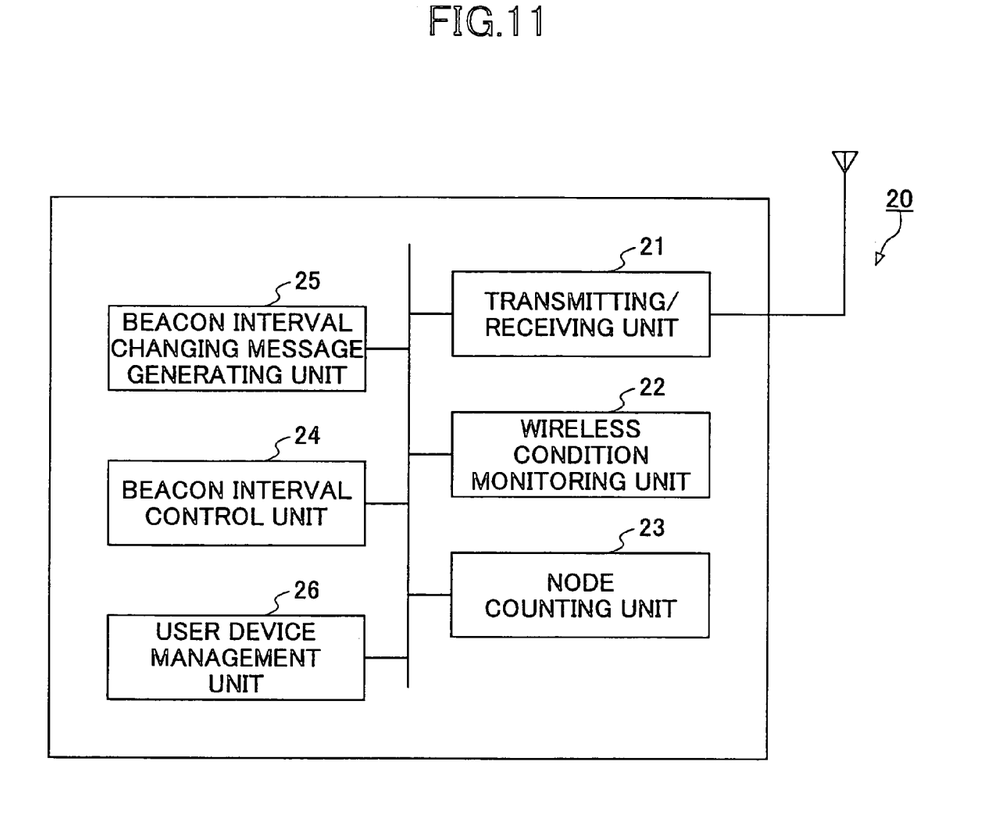
FIG. 11 is a schematic block diagram illustrating a wireless communication apparatus according to an embodiment of the invention.

FIG. 11 is a schematic block diagram of the wireless communication apparatus 20 according to an embodiment of the invention. The wireless communication apparatus 20 corresponds to, for example, the wireless mobile device shown in FIG. 1 or the wireless base station or the access point (AP) shown in FIG. 2. The wireless communication apparatus 20 includes a transmitting/receiving unit 21 configured to transmit and receive beacon signals and data packets, a wireless condition monitoring unit 22 configured to monitor the wireless section utilization status, a node counting unit 23 configured to detect the number of nearby nodes, a beacon interval control unit 24 configured to change the beacon transmission interval based on the wireless conditions or the detected number of nearby nodes, a beacon interval changing message generating unit 25 configured to generate a beacon interval changing message depending on the situation, and a user device management unit 26.

The wireless condition monitoring unit 22 measures the wireless section utilization status and/or channel occupation ratio. The node counting unit 23 includes a counter for counting the beacon signals transmitted from the nearby nodes, and determines the number of nearby nodes existing in communication range of the apparatus 20. The user device management unit 26 manages the total number, the transmission schemes, and the operating modes of the user devices (ST) currently located under the apparatus 20.

The beacon interval control unit 24 changes the beacon transmission interval according to the algorithms illustrated in FIG. 4A and FIG. 4B based on the information acquired by the wireless condition monitoring unit 22 and the node counting unit 23. If the established network is a mesh network, one or more algorithms shown in FIG. 8 through FIG. 10 are appropriately selected and used to change the beacon interval based on the information managed by the user device management unit 26. In this case, the beacon interval control unit 24 causes the beacon interval changing message generating unit 25 to create a beacon interval changing message, and causes the transmitting/receiving unit 21 to transmit the created message to the user devices (STs) located under this wireless communication apparatus (AP), as necessary.

With the wireless communication apparatus 20 having the above-described structure, the issue of the wireless channel resource consumption in an ad-hoc wireless network is solved and the wireless channel availability in the network is increased as a whole.

Figure 12:
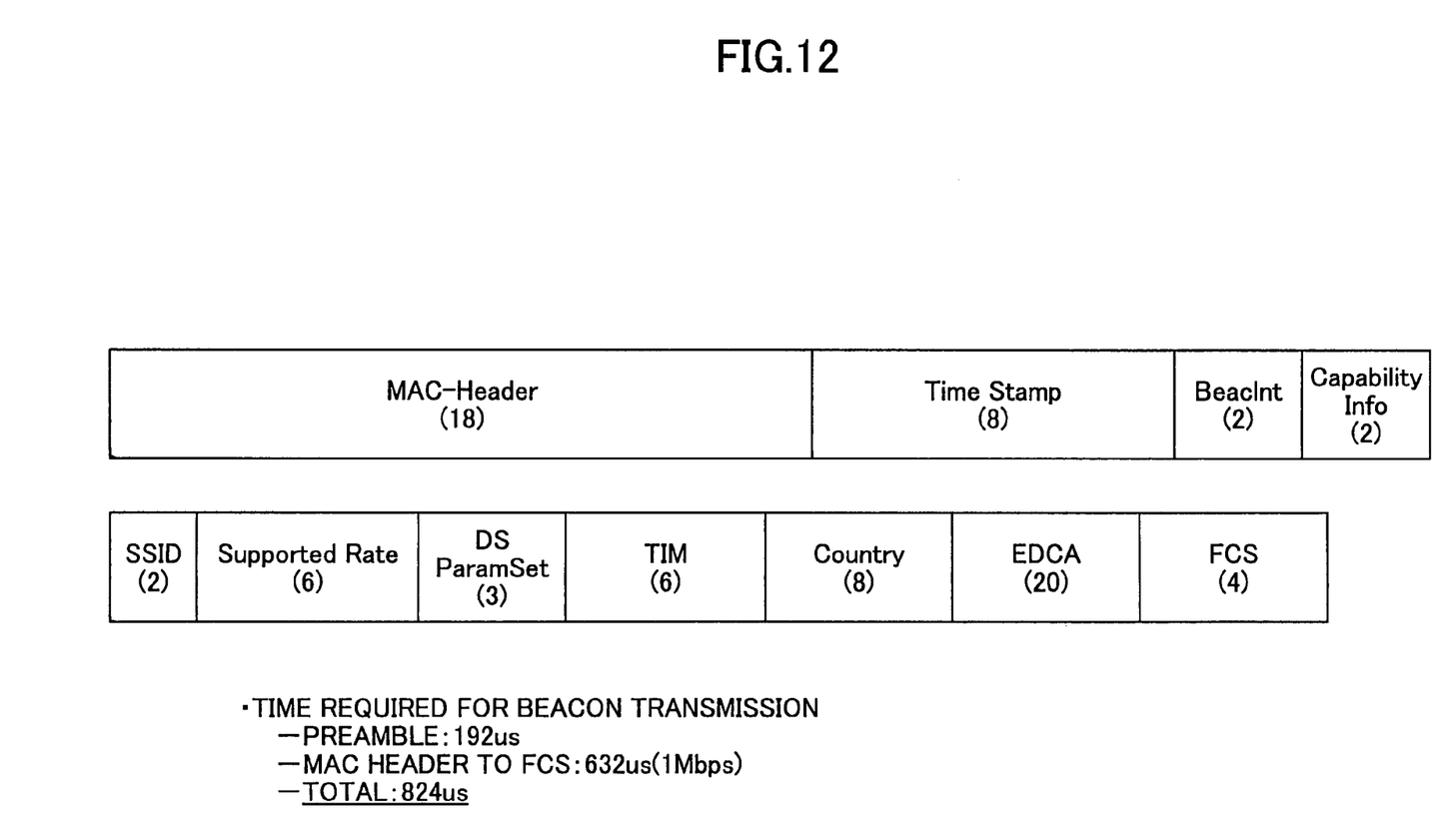
FIG. 12 is a schematic data diagram illustrating a beacon frame.

FIG. 12 is an example of a beacon frame used in an ad-hoc wireless network. In general, a beacon is transmitted at the minimum bit rate in order to broadcast the common information in as broad area as possible. It takes 824 μs to transmit the beacon frame, including the preamble, shown in FIG. 12. If data are transmitted at the rate of 11 Mbps generally used in the IEEE 802.11b during the time period of 824 μs, about 9 kilobit (824 μs×11 Mbps) data can be transmitted. If an access point transmits a beacon at an interval of 100 ms, and if this beacon transmission is applied to the 11 Mbit/s data transmission channel, then about 90 kbps (9 kb/100 ms) channel consumption occurs.

As explained in conjunction with FIG. 3, the wireless channel resource consumption increases in proportion to the number of nodes existing in the communication area and transmitting beacons. If all the thirty two (32) access points, which is the target number of access points defined by the IEEE 802.11b, exist in the same communication area, about 2.8 Mbps (32×90 kbps) of the data transmission channel is used.

In contrast, with the technique of the embodiment, the wireless channel consumption due to beacon transmission can be maintained substantially constant even if thirty two access points exist in the communication area.

Figure 13:
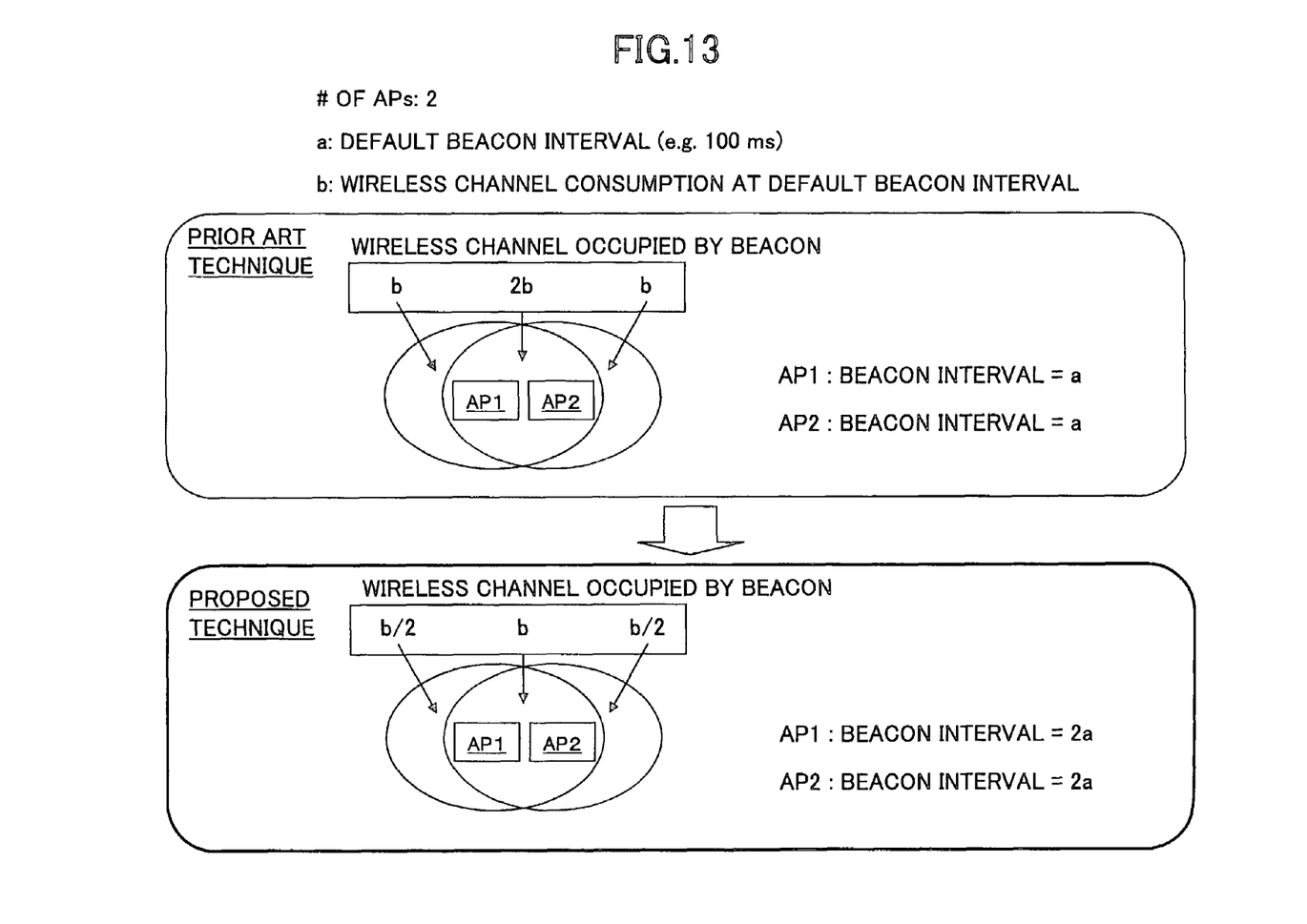
FIG. 13 is a schematic diagram illustrating the advantageous effect of the present invention where the number of access points is two.
Figure 14:
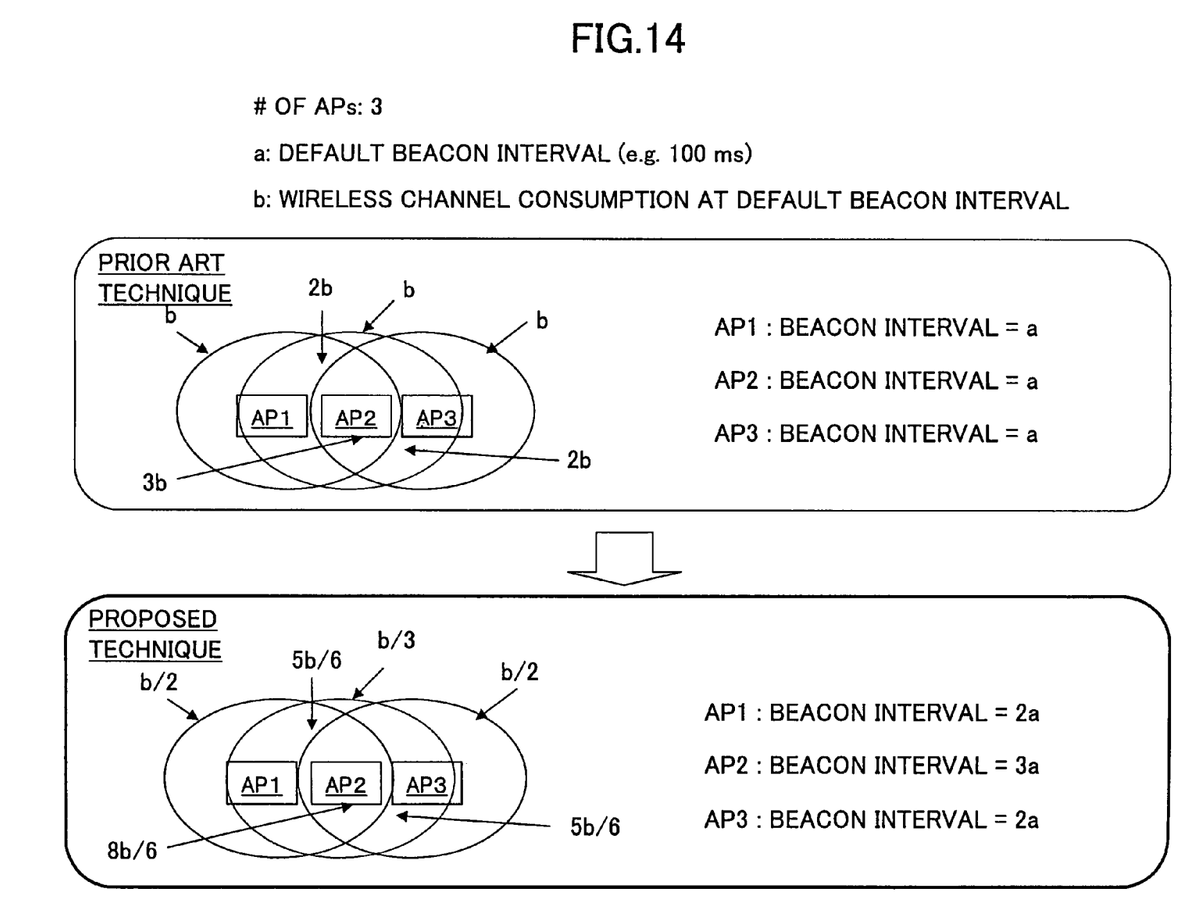
FIG. 14 is a schematic diagram illustrating the advantageous effect of the present invention where the number of access points is three.

FIG. 13 and FIG. 14 are schematic diagrams illustrating the advantage of the constant wireless channel consumption according to the embodiment. In FIG. 13 and FIG. 14, the initial beacon interval is "a", and the wireless channel consumption caused when a beacon is transmitted at initial beacon interval is "b".

In FIG. 13, there are two access points (APs) existing in communication range. With a conventional technique, the wireless channel consumption becomes 2b in the overlapped area in which both access points AP1 and AP2 can receive beacon signals from each other. In contrast, with the method of the present embodiment, each of the access points AP1 and AP2 detects the other node and sets the beacon interval to 2a.

As a result, the wireless channel consumption by the beacon transmission from each access point becomes b/2, and the channel consumption in the overlapped area is maintained at "b".

In FIG. 14, there are three access points (APs) existing in communication range. With a conventional technique, the wireless channel consumption becomes 3b in the overlapped area in which all of the access points AP1, AP2 and AP3 can receive beacon signals from each other. In contrast, with the method of the present embodiment, AP 2 that can receive beacon signals from AP1 and AP3 triples the beacon interval (changing to 3a), and AP1 and AP3, each of which receives the beacon only from AP2, double the beacon interval (changing to 2a). As a result, the wireless channel consumption by beacons of AP2 becomes b/3, while those of AP1 and AP2 each become b/2. The wireless channel consumption in the three-node overlapping area becomes Bb/6, and that in the two-node overlapping area (AP1 and AP2, AP2 and AP3) becomes 5b/6.

The above-described method is based upon the assumption that access points existing at a same frequency can always communicate with other node; however, the method is applicable to the situation where some nodes cannot communicate with other nodes due to an unsuccessful authentication process. For example, even if authentication of an existing nearby node AP0 is unsuccessful and AP0 cannot be authenticated, the initial node may increase the beacon interval so as not to overrun the wireless channel of AP0 according to the number of detected nodes based on the received beacon signals.

Although the present invention has been described using a specific example of the IEEE 802.11 wireless LAN, the invention is not limited to this example and applicable to arbitrary wireless communication systems configured to transmit a common broadcast signal or an indicator for enhancing wireless communications.

By employing the structure of the embodiment, the performance of an ad-hoc wireless network can be improved as a whole.

In addition, reliable connectivity of a wireless LAN device can be assured through collision avoidance among beacon packets.

The beacon interval changing message generating unit corresponds to the reporting unit described in claims, which unit is configured to report the change of beacon transmission interval to the user devices.

This patent application is based on and claims the benefit of the earlier filing date of Japanese Patent Application No. 2005-102873 filed Mar. 31, 2005, the entire contents of which are hereby incorporated by reference.

What is claimed is:

1. A wireless communication apparatus capable of structuring an ad-hoc wireless network, comprising:
a transmitting/receiving unit configured to transmit and receive a common broadcast signal;
a node counting unit configured to determine the number x of communication nodes existing in a communication range of the wireless communication apparatus, the communication nodes including the wireless communication apparatus; and
a transmission interval control unit configured to adjust a transmission interval of the common broadcast signal to be transmitted depending on the number x of communication nodes determined by the node counting unit,
wherein in response to the node counting unit detecting one additional communication nodes in the communication range and incrementing the number x of communication nodes by one, the transmission interval control unit is configured to adjust the transmission interval to be equal to a product of a predefined initial transmission interval and (x+1).

2. The wireless communication apparatus of claim 1, further comprising:
a user device management unit configured to monitor an operating mode of a user device currently located under the wireless communication apparatus;
wherein the transmission interval control unit does not change the transmission interval of the common broadcast signal when the user device is in a prescribed operating mode, the prescribed operating mode disabling the wireless communication apparatus from communicating with the user device.

3. The wireless communication apparatus of claim 1, further comprising:
a user device management unit configured to monitor an operating mode of a user device currently located under the wireless communication apparatus; and
a reporting unit configured to report a change of the transmission interval to the user device,
wherein the transmission interval control unit causes the reporting unit to create a transmission interval changing message and causes the transmitting/receiving unit to transmit the message to the user device when the user device is in a prescribed operating mode, the prescribed operating mode disabling the wireless communication apparatus from communicating with the user device.

4. A wireless communication system applicable to an ad-hoc wireless network, the system including:
two or more wireless communication apparatuses capable of structuring the ad-hoc wireless network,
wherein each of the wireless communication apparatuses comprises:
a transmitting/receiving unit configured to transmit and receive a common broadcast signal;
a node counting unit configured to determine the number x of communication nodes existing in a communication range of the wireless communication apparatus, the communication nodes including the wireless communication apparatus; and
a transmission interval control unit configured to adjust a transmission interval of the common broadcast signal to be transmitted depending on the number x of communication nodes determined by the node counting unit,
wherein in response to the node counting unit detecting one additional communication nodes in the communication range and incrementing the number x of communication nodes by one, the transmission interval control unit is configured to adjust the transmission interval to be equal to a product of a predefined initial transmission interval and (x+1).

5. The wireless communication system of claim 4, wherein when a first wireless communication apparatus currently transmitting the common broadcast signal at an initial interval receives a connection request from a second wireless communication apparatus, the transmission interval control unit of the first wireless communication apparatus changes the transmission interval of the common broadcast signal upon starting to communicate with the second wireless communication apparatus.

6. The wireless communication system of claim 5, wherein the transmission interval control unit doubles the initial interval upon starting to communicate with the second wireless communication apparatus.

7. The wireless communication system of claim 5, wherein the transmission interval changing unit of the second wireless communication apparatus changes the transmission interval of the common broadcast signal to be transmitted from the second wireless communication apparatus by monitoring the common broadcast signal transmitted from the first wireless communication apparatus.

8. The wireless communication system of claim 5, wherein the transmission interval changing unit of the second wireless communication apparatus doubles an initial interval of the second wireless communication apparatus upon starting to communicate with the first wireless communication apparatus.

9. The wireless communication system of claim 8, wherein when the second wireless communication apparatus detects a third wireless communication apparatus, in addition to the first wireless communication apparatus, in a communication range of the second wireless communication apparatus, the transmission interval control unit of the second wireless communication apparatus triples the initial interval to change the transmission interval.

* * * * *